J. R. HOFMANN AND C. LAUGHLIN.
EXPOSURE IDENTIFICATION ATTACHMENT FOR CAMERAS.
APPLICATION FILED OCT. 17, 1914.
1,363,414.
Patented Dec. 28, 1920.
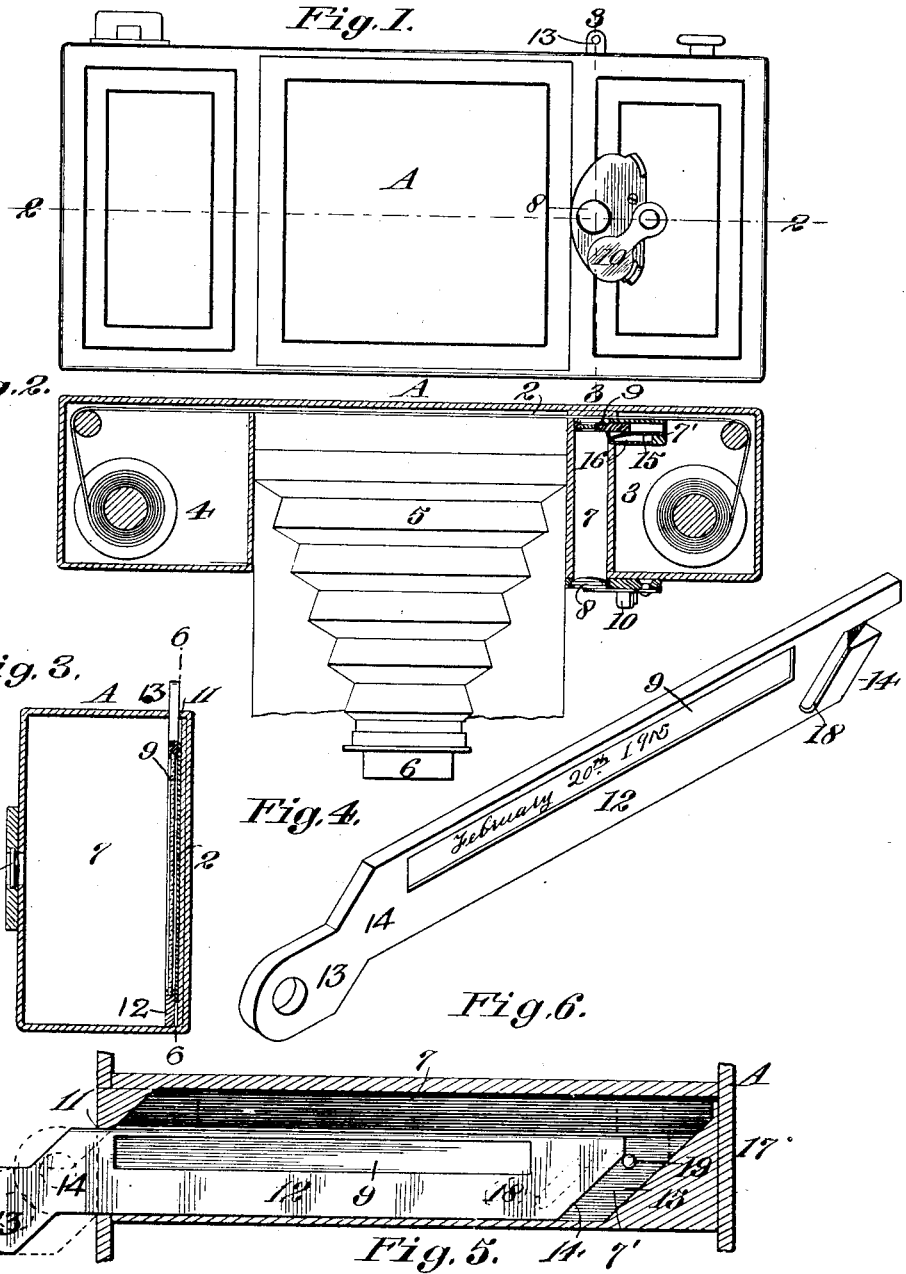
WITNESSES:
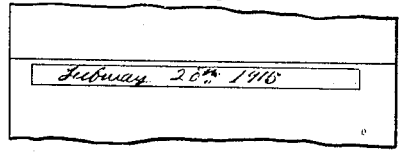
INVENTORS.
John R. Hofmann
Carlisle Laughlin.
BY G. H. Strong.
ATTORNEY

UNITED STATES PATENT OFFICE.

JOHN R. HOFMANN AND CARLISLE LAUGHLIN, OF BERKELEY, CALIFORNIA, ASSIGNORS, BY MESNE ASSIGNMENTS, TO ANSCO COMPANY, OF BINGHAMTON, NEW YORK, A CORPORATION OF NEW YORK.

EXPOSURE-IDENTIFICATION ATTACHMENT FOR CAMERAS.

1,363,414. Specification of Letters Patent. Patented Dec. 28, 1920.

Application filed October 17, 1914. Serial No. 867,102.

*To all whom it may concern:*

Be it known that we, JOHN R. HOFMANN and CARLISLE LAUGHLIN, both citizens of the United States, and both residing at Berkeley, in the county of Alameda and State of California, have invented certain new and useful Improvements in Exposure-Identification Attachments for Cameras, of which the following is a specification.

The invention relates to a camera attachment for the purpose of identifying the successive pictures taken, and pertains especially to means for recording directly upon the sensitized picture-taking medium, whether film, cut film, or plate, such data as will identify the negative and also assist and guide the operator in the later development and treatment of the negative.

The special object of the invention is to provide a simple, practical means by which the sensitized medium (whether plate, film or film-pack), may be marked or imprinted upon at any time, while the sensitized medium is in appropriate position, either before or after the picture is taken, and for that reason it is highly desirable to render it possible for an operator to take the picture without any regard to a title. Frequently there is not time to determine the title of a picture, much less to write it or imprint it on the translucent record tablet (see below), before the sensitized medium is exposed. It is also essential that after exposure any identification of the sensitized medium shall be effected without any danger of reëxposing or fogging it. It is also desirable that the identifying data may be prepared outside of and independent of the camera and then inserted into the camera, and the exposure made without fear of injury to the rest of the sensitized medium. The purposes of the invention, in short, are to enable the person taking the picture to record not only the title of the picture, the time of day, etc., but also the length of exposure, the conditions of light, etc., directly on the sensitized medium as a guide to future development and treatment.

The invention comprises the parts and the combination and construction thereof as hereinafter more fully described and claimed, having reference to the accompanying drawings, in which Figure 1 is a front elevation of one form of camera to which the attachment has been applied; Fig. 2 is a horizontal section of the same on line 2—2 of Fig. 1, with the camera bellows extended; Fig. 3 is a section on line 3—3 of Fig. 1; Fig. 4 is a perspective of a suitable slide for the support and guidance of the translucent tablet; Fig. 5 is a detail of a portion of the film indicating the object of the invention; Fig. 6 is a view taken on the line 6—6 of Fig. 3 and illustrates the manner of inserting the slide into the compartment.

A represents a folding camera embodying well known construction to which the invention is applicable. It is adapted to use a roll film 2, which is drawn from a reel in a light tight compartment 3 at one end of and across the back of the camera, and on to a re-wind roller in the light tight compartment 4 at the other end of the camera. 5 is the usual bellows and 6 the camera lens.

The invention resides in introducing into the camera a separate light tight compartment 7, which may be provided with a lens 8, as shown, or if preferred, with a mere aperture, as is well known, through which light may be admitted and controlled to strike upon and pass through a translucent slide or tablet 9, removably contained in the compartment 7 and arranged immediately in front of an edge of the sensitized medium 2 undergoing exposure, the entrance of light to the lens or aperture 8 being controlled by a suitable shutter 10. The slide 9 may consist of a piece of ground glass, either plain or slightly colored, a strip of translucent celluloid, translucent paper, or the like, capable of being inserted through an appropriate slot 11 formed in a side wall of vestibule 7' and adapted to overlie the sensitized medium 2 when inserted.

In order to prevent fogging of the sensitized medium when inserting and withdrawing the slide due to light passing endwise through the translucent portion of the slide, we provide a safety attachment as follows: The slide 9 is preferably set into a metal or other suitable opaque frame 12 which has an angularly offset handle portion 13, and a beveled end 14. The slot 11 is placed at one side of the compartment 7 and opens into a light-tight vestibule 7', which is normally cut off from compartment 7 by a spring actuated damper or partition 15, so that any light that might enter compartment 7 through the slide 9 or the slot 11 is cut off by means of this spring actuated partition 15, which is so constructed and arranged that when the slide 9 is withdrawn from the camera, the partition automatically moves upwardly to intercept the light and prevent its entering the compartment 7. When the slide 9 is inserted into the slot 11 the slide may enter the camera to such a distance that the transparent or translucent portion is entirely inside the camera, leaving the slot 11 blanked by the opaque portion of the handle 13. No harm can come from any light that will pass endwise through the slide into the vestibule 7′, so long as the partition 15 remains closed, the vestibule being shut off from the rest of the camera.

Pushing the handle farther in causes the slide 9 to move diagonally and depress the damper 15 into a pocket 16 until finally the record tablet is brought into registration with the shuttered lens or aperture 8 and the portion of the film which is stretched across the back of the compartment 7, the beveled end of the slide carrier being carried forward in parallelism by reason of the bevel 14 engaging a corresponding beveled wall 17 formed in the camera. The metal end of the slide frame has a cam groove 18 engaging a pin 19 in the camera, so that when the slide is withdrawn, both of its ends will move diagonally back in unison and allow the spring actuated partition 15 to automatically close before the translucent slide 9 becomes exposed outside of the camera. This construction assures the record being made on the sensitized medium at right angles to its lateral edges.

In practice the shutter 10 is closed at all times except when a record is being made on the sensitized medium. To make such a record, the operator has simply to write upon the slide 9 such data as he wishes to appear ultimately on the negative and print, insert the slide into the compartment 7 and open the shutter 10 long enough to cause the matter written upon the slide 9 to be light printed on the edge of the sensitized medium.

That which is above described and illustrated in the drawings hereof is one form only in which our invention may be embodied, for it will be obvious to those who are familiar with such matters that modifications may be made in the details of construction of the parts and to some extent in their correlation without departing from the essentials of our invention. We therefore do not limit ourselves to such details.

We claim:

1. A camera having in addition to the usual coöperative parts, a translucent slide insertible into and removable from the camera and interposable between the sensitized medium and a source of light, means for preventing light entering the camera endwise through the slide and reaching the sensitized medium during the insertion and removal of the slide, the last named means including coöperative cam surfaces on the slide and on the camera, and a movable partition operated by the slide.

2. A camera having in addition to the usual coöperative parts a light tight chamber divided into two adjoining compartments by a movable, light excluding partition, an opening in the wall of the camera connecting with one of said compartments, a partly translucent and partly opaque device adapted to pass through said opening into said compartment, means to move said partition upon the insertion of said device, other means to transfer the translucent part of the device from said compartment into the adjoining compartment and into printing relation with the sensitized medium, and means to control the entrance of light to said adjoining compartment.

3. A camera having in addition to the usual coöperative parts, a partly translucent and partly opaque device insertible into and removable from the camera and interposable between the sensitized medium and a source of light, means for preventing light entering the camera through the translucent part of said device during the insertion and removal thereof from the camera, means to move the translucent part of the device into printing relation with the sensitized medium during its insertion into the camera, and means to permit and prevent the passage of light to and through said translucent part.

4. An exposure identification attachment for cameras comprising a light tight chamber divided into two adjoining compartments by a movable light excluding partition, a translucent device adapted to be thrust into one of said compartments, means to move said partition upon such insertion of said device, means to transfer said device from the compartment it enters into the adjoining compartment and into printing relation with the sensitized medium, and means to control the entrance of light into said adjoining compartment.

5. An exposure identification attachment for cameras comprising a light tight chamber divided into two adjoining compartments by a movable light excluding partition, a translucent device adapted to be thrust into one of said compartments, means to move said partition upon such insertion of said device, means to transfer said device from the compartment it enters into the adjoining compartment and into printing relation with the sensitized medium and to assure its position at right angles to the lateral side thereof, and means to control the entrance of light into said adjoining compartment.

6. An exposure identification attachment for cameras comprising a light tight chamber adjoining the focal plane and at the front of the sensitized medium, a translucent device adapted to be thrust into said compartment and co-acting parts upon said device and within said compartment whereby the translucent device is caused to assume printing relation with the sensitized medium and at right angles to its lateral sides, and means to control the entrance of light to said compartment.

7. An exposure identification attachment for cameras embodying a light tight chamber located adjacent to the focal plane and at the front of the sensitized medium, a partly translucent and partly opaque device adapted to be thrust into said chamber, means to move said device when within the chamber into printing relation with the sensitized medium, the opaque part of said device during said movements excluding the entrance of light, and means to permit the entrance of light to said translucent part when in proper printing relation with the sensitized medium.

8. A camera having in addition to the usual coöperative parts a light tight chamber divided into two adjoining compartments by an automatically acting light excluding partition, an opening in the wall of the camera connecting with one of said compartments, a translucent device adapted to pass through said opening into said compartment, means upon said device which during its insertion moves said partition, means upon said device and coöperating means within the compartment which transfer said translucent device into printing relation with the sensitized medium and assure its proper position relative thereto, and means to control the passage of light to said translucent device.

9. A camera having in addition to the usual coöperative parts a light tight chamber divided into two adjoining compartments by a spring actuated light excluding partition, an opening in the wall of the camera connecting with one of said compartments, a translucent device adapted to pass through said opening into said compartment, means upon said device which during its insertion moves said partition compressing its spring, means upon said device and coöperating means within the compartment which transfer said translucent device into printing relation with the sensitized medium and assure its proper position relative thereto, and means to control the passage of light to said translucent device.

10. A camera having an autographic attachment embodying a long and narrow translucent strip, upon which the record may be initially produced, said strip being arranged transversely of the camera adjacent to the sensitized side of the sensitive element therein, and at one edge of the focal field of the camera, and being adapted to endwise movement during insertion and removal from the camera, and means, which control the entrance of light to the strip, separate from and independent of the lens shutter and so constructed and operated that it simultaneously admits light to all parts of the strip.

11. A camera having an autographic attachment embodying a long and narrow translucent strip, upon which the record may be initially produced, said strip being arranged transversely of the camera adjacent to the sensitized side of the sensitive element therein, and at one edge of the focal field of the camera, and being adapted to endwise movement during its insertion and removal from the camera, means which control the entrance of light to the strip, separate from and independent of the lens shutter and so constructed and operated that it simultaneously admits light to all parts of the strip, and other means to prevent the entrance of light upon the withdrawal of the strip.

In testimony whereof we have hereunto set our hands in the presence of two subscribing witnesses.

JOHN R. HOFMANN.
CARLISLE LAUGHLIN.

Witnesses:
JOHN H. HERRING,
W. W. HEALEY.